United States Patent [19]

Adelman

[11] Patent Number: 4,657,365
[45] Date of Patent: Apr. 14, 1987

[54] AUTOMATIC CAMERA WINDING APPARATUS

[76] Inventor: Menachem J. Adelman, 1635 E. 10th St., Brooklyn, N.Y. 11223

[21] Appl. No.: 806,024

[22] Filed: Dec. 6, 1985

[51] Int. Cl.⁴ ............................ G03B 1/12; G03B 1/18
[52] U.S. Cl. ................................ 354/173.1; 354/266; 242/71.5
[58] Field of Search ................ 354/173.1, 173.11, 214, 354/266, 212; 242/71.4, 71.5, 71.6

[56] References Cited

U.S. PATENT DOCUMENTS

| 3,762,291 | 10/1973 | Kimura et al. | 354/173.1 |
| 3,783,762 | 1/1974 | Sugimori | 354/173.1 |
| 4,006,489 | 2/1977 | Aizawa et al. | 354/173.1 |
| 4,171,892 | 10/1979 | Kozuki et al. | 354/173.1 |
| 4,194,824 | 3/1980 | Arai et al. | 354/173.1 |
| 4,350,424 | 9/1982 | Iwashita et al. | 354/173.1 |
| 4,522,477 | 6/1985 | Iwashita et al. | 354/173.1 |

Primary Examiner—A. A. Mathews
Attorney, Agent, or Firm—Richard M. Goldberg

[57] ABSTRACT

An automatic winding apparatus for a Hasselblad 500 series camera of the type having an internal film advancement mechanism and a drive socket associated with the internal film advancement mechanism, comprising a motor drive including a base for supporting the camera, a drive engagement section having a drive engaging sprocket, a motor for driving the drive engaging sprocket and a trigger release button for actuating the motor to drive the drive engaging sprocket; and a gear assembly including a first gear for operatively engaging with the drive socket, a second gear for operatively engaging with the drive engaging sprocket and a third gear between and in meshing engagement with the first and second gears, such that the motor drives the internal film advancement mechanism through the drive engaging sprocket, the second gear, the first gear and the drive socket.

11 Claims, 6 Drawing Figures

AUTOMATIC CAMERA WINDING APPARATUS

BACKGROUND OF THE INVENTION

The present invention relates generally to camera winding apparatus and, more particularly, is directed to an automatic camera winding apparatus for use particularly with a Hasselblad 500 series camera.

With many sophisticated cameras, a manual winding mechanism is provided for winding the film to the next frame after a picture has been taken. However, with a manual winding system, the taking of a quick succession of pictures becomes impossible. Further, manual winding operations using a knob may cause uneven wear of the winding apparatus within the camera due to irregular manual turning of the knob.

While winding with a a hand crank provides an improvement, the final turn that is made on, for example, a Hasselblad camera requires careful attention due to a stiff path that the film must follow in such camera.

Accordingly, motor drive systems have been provided to replace, or supplement, such manual winding systems. Motor drive systems assure regularity of film advancement, that is, the film is always advanced with the same torque, thereby providing longevity of the camera winding mechanism. Automatic film advancement also permits the use of remote control and electronic timing.

However, no such motor drive systems which provide automatic advancement of film, lens cocking and mirror return, have been manufactured for some cameras, whereby the film must be manual wound, resulting in the aforementioned deficiencies. One of these cameras is the Hasselblad 500 series camera.

OBJECTS AND SUMMARY OF THE INVENTION

Accordingly, it is an object of the present invention to provide an automatic camera winding apparatus that overcomes the aforementioned deficiencies.

More particularly, it is an object of the present invention to provide an automatic camera winding apparatus that can be used with a Hasselblad 500 series camera.

In accordance with an aspect of the present invention, an automatic winding apparatus for a camera of the type having an internal film advancement mechanism and a drive socket associated with the film advancement mechanism, comprising:

a motor drive including base means for supporting the camera, a drive engagement section having a drive engaging sprocket, motor means for driving the drive engaging sprocket and actuating means for actuating the motor means to drive the drive engaging sprocket; and a gear assembly including at least first gear means for operatively engaging with the drive socket and second gear means for operatively engaging the drive engaging sprocket with the first gear means such that the motor means drives the internal film advancement mechanism through the drive engaging sprocket, the second gear means, the first gear means and the drive socket.

The above and other, objects, features and advantages of the present invention will be readily apparent from the following detailed description, which is to be read in connection with the accompanying drawings.

DETAILED DESCRIPTION OF A PREFERRED EMBODIMENT

Figure 1:
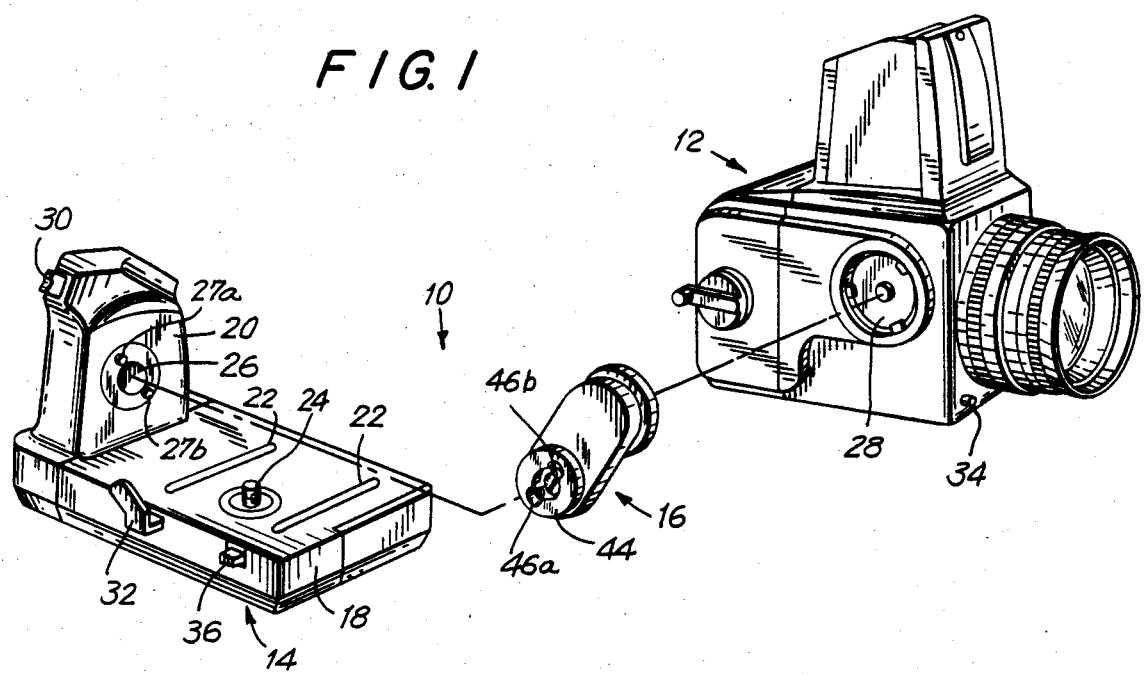
FIG. 1 is a perspective, blown apart view of automatic camera winding apparatus according to one embodiment of the present invention.
Figure 2:
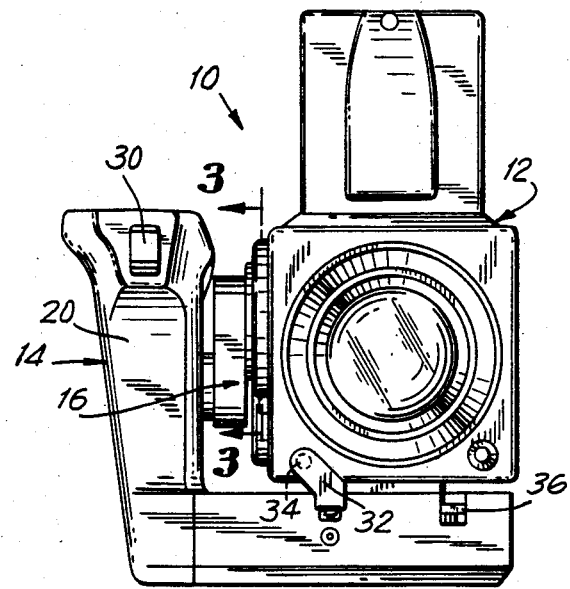
FIG. 2 is a front plan view of the automatic camera winding apparatus of FIG. 1 in assembled condition.
Figure 3:
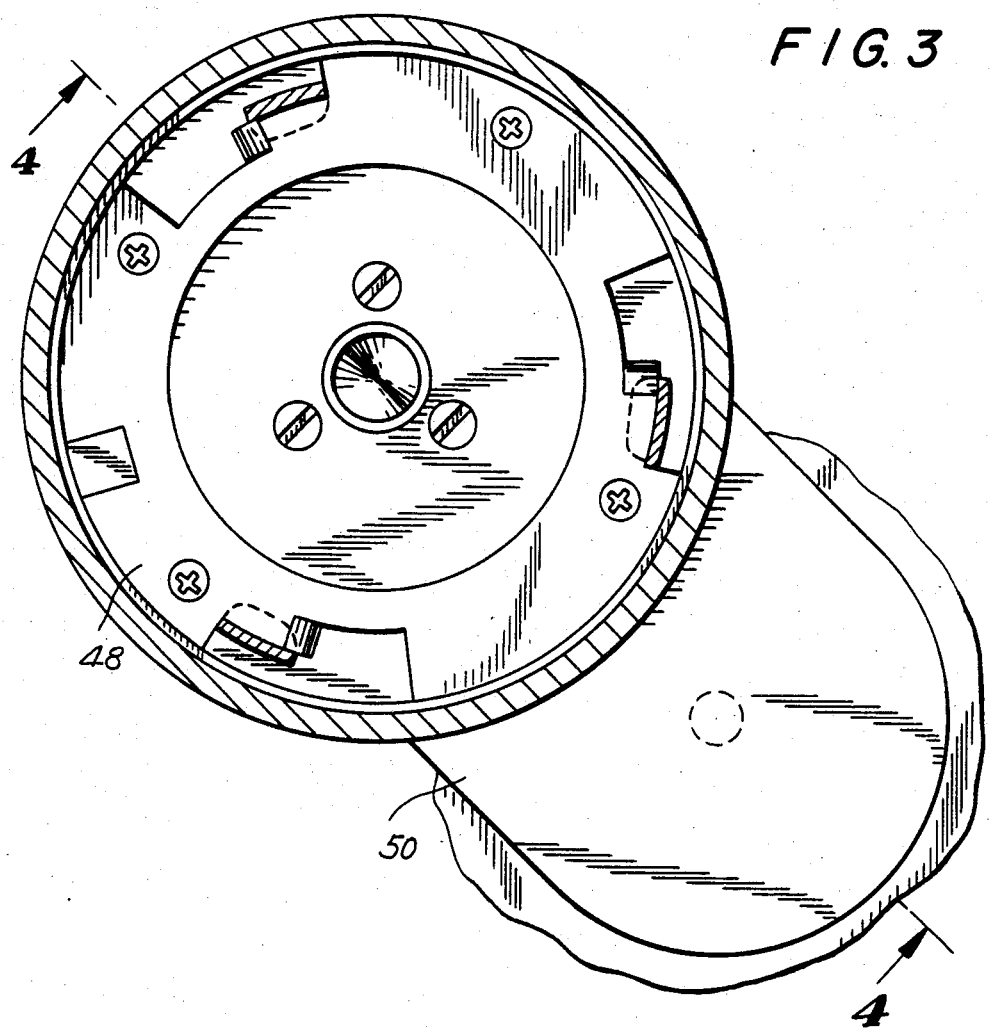
FIG. 3 is a plan view of the gear mechanism of the automatic camera winding apparatus of FIG. 2, viewed from line 3—3 thereof.
Figure 4:
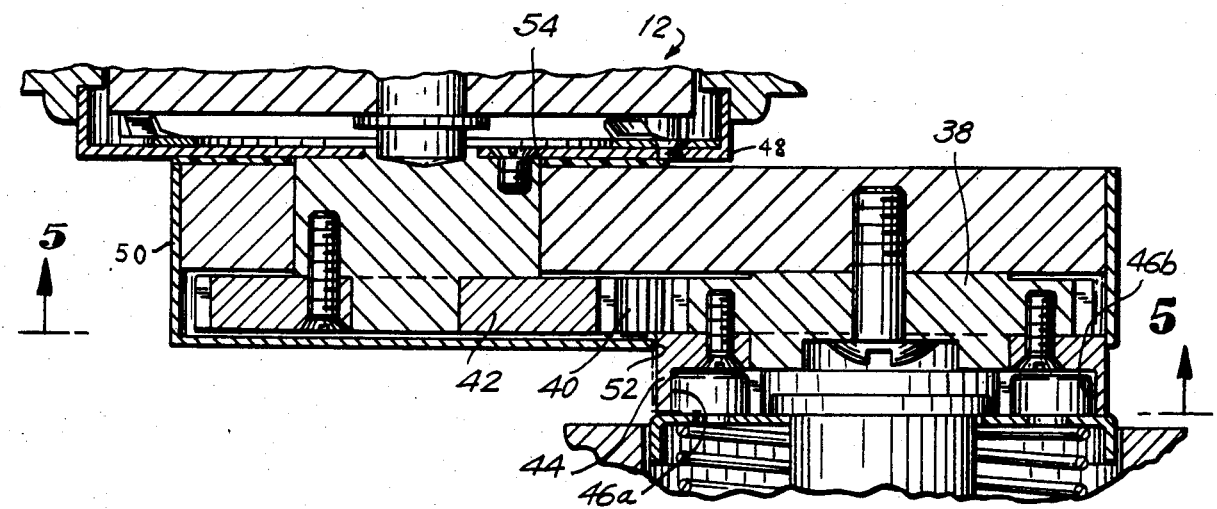
FIG. 4 is a cross-sectional view of the gear mechanism of FIG. 3, taken along line 4—4 thereof, in assembled condition.

Referring to the drawings in detail, and initially to FIG. 1 thereof, an automatic camera winding apparatus 10 according to one embodiment of the present invention, having particular applicability with a Hasselblad 500 series camera 12, generally includes a conventional motor drive 14 and a gear assembly 16 for meshingly connecting motor drive 14 with gearing (not shown) of an internal film winding mechanism (not shown) built into camera 12. In accordance with a preferred embodiment of the invention, that is, for use with a Hasselblad 500 series camera, motor drive 14 is a Mamiya motor drive built for the Mamiya 645 camera.

Specifically, motor drive 14 includes a base 18 for supporting camera 12, and a drive engagement section 20 upstanding at one end of base 18. As shown, base 18 includes two parallel, spaced, longitudinal rails 22 extending transversely of base 18. The lower body (not shown) of camera 12 includes corresponding rails (not shown) which slide on rails 22, whereby camera 12 can be slid onto base 18 in a conventional manner. When camera 12 is slid onto base 18, a conventional tripod hole (not shown) at the bottom of camera 12 mates with a tripod screw 24 positioned on base 18 between rails 22. Thus, camera 12 can be locked in position on base 18.

A drive engaging sprocket 26 extends from drive engagement section 20. Drive engaging sprocket 26 normally engages with a corresponding drive socket in camera 12, and in this regard, includes two diametrically opposite pins 27a and 27b. Drive engaging sprocket 26 is driven by a motor (not shown) within the housing of motor drive 14, and the drive socket in camera 12 is conventionally connected with an automatic film advancing mechanism (not shown) built into camera 12. However, as aforementioned, there is no motor drive 14 that can operate with certain cameras, such as a Hasselblad 500 series camera. Although a Hasselblad 500 series camera includes a drive socket 28 which is connected with the internal film advancing mechanism (not shown) of the camera and which can be connected with a hand crank accessory, drive engaging sprocket 26 will not mate with drive socket 28 of a Hasselblad 500 series camera 12, although it will mate with the drive socket of a Mamiya camera. Thus, there is no automatic winding mechanism for a Hasselblad 500 series camera.

A trigger release button 30 is provided at the upper end of drive engagement section 20 by which motor drive 14 is actuated to advance the film one frame at a time, when motor drive 14 is operatively connected with camera 12. If button 30 is pressed once, the film is advanced one frame, while if button 30 is maintained in a depressed state, the film is continuously advanced one frame at a time.

When trigger release button 30 is depressed, a trigger release linkage 32 extending from the side of base 18 is actuated. Specifically, trigger release linkage 32 is actuated to depress a shutter control button 34 at the front of camera 12 after each time the film is advanced one frame, so that a picture is automatically taken.

An ON/OFF switch 36 is also provided at the side of base 18, for turning motor drive 14 on.

Figure 5:
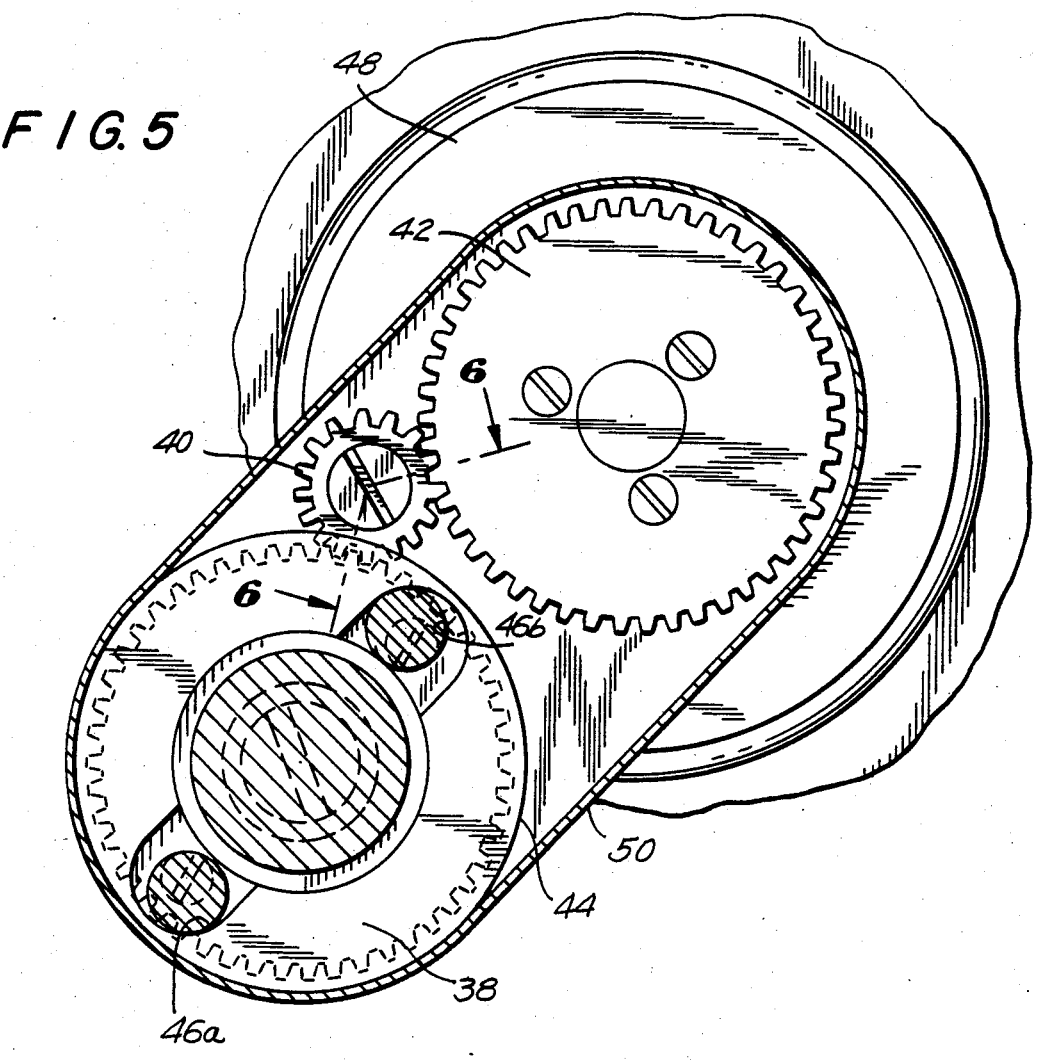
FIG. 5 is a cross-sectional view of the gear mechanism of FIG. 4, taken along line 5—5 thereof.
Figure 6:
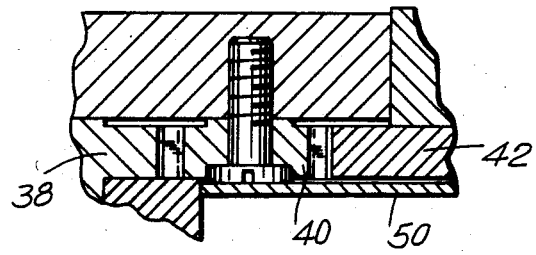
FIG. 6 is a cross-sectional view of the gear mechanism of FIG. 5, taken along line 6—6 thereof.

In accordance with the present invention, gear assembly 16 connects drive engaging sprocket 26 with drive socket 28 when camera 12 is locked on base 18, whereby the film can automatically be advanced and the shutter automatically controlled in a Hasselblad 500 series camera 12. Gear assembly 16 includes a first gear 38, a second gear 40 and a third gear 42, all in serial meshing engagement, as shown in FIG. 5. A coupling member 44 is secured to first gear 38, and includes two diametrically opposite apertures 46a and 46b for receiving pins 27a and 27b of drive engaging sprocket 26 in driving engagement. In like manner, a bayonet plate 48 is secured to third gear 42 and matingly engages with drive socket 28 of camera 12. A housing 50 encloses gears 38, 40 and 42 and includes two openings 52 and 54 at opposite ends of and on opposite sides thereof through which coupling member 44 and bayonet plate 48 extend, respectively. In a preferred embodiment, where a motor drive 14 for a Mamiya 645 camera is used, the gear ratios of gears 38, 40 and 42 are 47:15:47, where the latter numbers represent the ratio of the number of teeth for the respective gears, and the diameters of the gears are 25 mm, 10 mm and 25 mm, respectively.

With such arrangement, the motor drive for a Mamiya 645 camera can be used to drive a Hasselblad 500 series camera. Specifically, with gear assembly 16, the motor (not shown) in motor drive 14, which is operatively connected with the drive mechanism within camera 12, senses the tension in the winding system of camera 12, and thereby advances the film to the first frame, and thereafter, sequentially advances the film for the next twelve frames and then completely advances and winds the film onto the take-up spool in camera 12. It will be appreciated that, presently, with a Hasselblad 500 series camera, and without the present invention, this operation must be performed manually, with the resultant aforementioned disadvantages. In addition, by using the aforementioned motor drive, there is a further advantage in that motor drive 14 also constitutes a holding grip by which camera 12 can be easily handled.

Of course, it will be appreciated that the present invention is not limited to use with a Hasselblad 500 series camera, and that other cameras for which motor drives are not built, can be used. Further, the number of gears and the gear ratios may vary.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope and spirit of the invention as defined by the appended claims.

What is claimed is:

1. An automatic winding apparatus for a camera of the type having an internal film advancement mechanism and a drive socket associated with said film advancement mechanism, comprising:
   a motor drive including base means for supporting said camera, a drive engagement section having a drive engaging sprocket, motor means for driving said drive engaging sprocket and actuating means for actuating said motor means to drive said drive engaging sprocket; and
   a gear assembly including at least first gear means for operatively engaging with said drive socket and second gear means for operatively engaging said drive engaging sprocket with said first gear means such that said motor means drives said internal film advancement mechanism through said drive engaging sprocket, said second gear means, said first gear means and said drive socket.

2. An automatic winding apparatus according to claim 1; wherein said gear assembly includes third gear means positioned between said first and second gear means for drivingly connecting said first and second gear means.

3. An automatic winding apparatus according to claim 2; wherein said first, second and thrid gear means have a respective gear ratio of approximately 47:15:47.

4. An automatic winding apparatus according to claim 1; wherein said gear assembly includes coupling member means secured to said second gear means for releasably securing said second gear means to said drive engaging sprocket, and bayonet plate means secured to said first gear means for releasably securing said first gear means to said drive socket of said camera.

5. An automatic winding apparatus according to claim 1; wherein said camera includes trigger release button means for actuating an internal shutter mechanism of said camera, and said motor drive includes trigger release linkage means for actuating said trigger release button means when said actuating means on said motor drive is actuated.

6. An automatic winding apparatus according to claim 1; wherein said base means of said motor drive includes securing means for securing said camera thereto.

7. An automatic winding apparatus according to claim 6; wherein said securing means includes corresponding rail means on each of said base means and said camera.

8. A gear assembly for operatively connecting a camera of the type having an internal film advancement mechanism and a drive socket associated with said film advancement mechanism, to a motor drive including base means for supporting said camera, a drive engagement section having a drive engaging sprocket, motor means for driving said drive engaging sprocket and actuating means for actuating said motor means to drive said drive engaging sprocket, said gear assembly comprising:
   first gear means for operatively engaging with said drive socket; and
   second gear means for operatively engaging said drive engaging sprocket with said first gear means such that said motor means drives said internal film advancement mechanism through said drive engaging sprocket, said second gear means, said first gear means and said drive socket.

9. An automatic winding apparatus according to claim 8; wherein said gear assembly includes third gear means positioned between said first and second gear means for drivingly connecting said first and second gear means.

10. An automatic winding apparatus according to claim 9; wherein said first, second and third gear means have a respective gear ratio of approximately 47:15:47.

11. An automatic winding apparatus according to claim 8; wherein said gear assembly includes coupling member means secured to said second gear means for releasably securing said second gear means to said drive engaging sprocket, and bayonet plate means secured to said first gear means for releasably securing said first gear means to said drive socket of said camera.

* * * * *